United States Patent
Sato et al.

(10) Patent No.: US 7,187,655 B1
(45) Date of Patent: Mar. 6, 2007

(54) INFORMATION COMMUNICATION METHOD AND APPARATUS

(75) Inventors: Makoto Sato, Tokyo (JP); Naoyuki Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 1553 days.

(21) Appl. No.: 09/650,351

(22) Filed: Aug. 29, 2000

(30) Foreign Application Priority Data

Aug. 31, 1999 (JP) .......................................... 11-246547

(51) Int. Cl.
*H04L 12/40* (2006.01)

(52) U.S. Cl. ........................ 370/252; 370/257; 370/468
(58) Field of Classification Search ................. 370/252, 370/254, 257, 468, 537
See application file for complete search history.

(56) References Cited

U.S. PATENT DOCUMENTS

| | | | | |
|---|---|---|---|---|
| 5,687,319 A | * | 11/1997 | Cook et al. ................. | 370/256 |
| 6,212,171 B1 | * | 4/2001 | LaFollette et al. .......... | 370/257 |
| 6,466,549 B1 | * | 10/2002 | Hattig ........................ | 370/254 |
| 6,529,951 B1 | * | 3/2003 | Okuyama et al. ........... | 709/223 |
| 6,556,543 B1 | * | 4/2003 | Park et al. .................. | 370/255 |

FOREIGN PATENT DOCUMENTS

WO    WO 99 67760    12/1999

OTHER PUBLICATIONS

IEEE Standards Board: "IEEE Standard for High Performance Serial Bus" IEEE Computer Society IEEE STD 1394-1995, 'Online! 1996, pp. 293-298, XP002274354 NY, USA Retrieved from the Internet: <URL:www.ieeeexplore.ieee.org/xpl/standards.jsp>'retrieved on Mar. 25, 2004 !.

* cited by examiner

*Primary Examiner*—Min Jung
(74) *Attorney, Agent, or Firm*—Frommer Lawrence & Haug LLP; William S. Frommer; Dennis M. Smid

(57) ABSTRACT

To minimize the bandwidth (or overhead) of isochronous data transfer in the IEEE 1394 standard and to minimize the signal-less periods (gaps) in asynchronous data transfer, and thereby achieve effective utilization of system resources, the IEEE 1394 interface of a transmitting node acquires the node ID of the root node in the system. Since the actual number of hops is equal to the root node_ID, the arbitration time and the propagation time are calculated based upon the actual number of hops, and from which the bandwidth for isochronous data transfer is determined. Hence, the bandwidth is allocated by the isochronous resource manager node, using the root node_ID to represent the actual number of hops. Gaps for asynchronous data transfer likewise are determined as a function of the actual number of hops that are present in the system, rather than the theoretical maximum number of hops. Thus, the size of the gaps may be reduced.

8 Claims, 19 Drawing Sheets

| DEFINITION | |
|---|---|
| APPOINTMENT —19— | bw_remaining —13— |

| INITIAL VALUE | |
|---|---|
| 0 | 4915 |

| READ-IN VALUE | |
|---|---|
| 0 | DIRECTLY PREVIOUS SUCCESSFUL LOCK |

| EFFECT OF LOCK | |
|---|---|
| DISREGARDED | CONDITIONAL WRITING |

| 10 | phy_ID | 0 | L | gap_cnt | sp | del | c | pwr | p0 | p1 | p2 | i | m |

TRANSMIT FIRST → TRANSMIT LAST

SELF-ID PACKET #0

FIG.4B

| 10 | phy_ID | 1 | n | rsv | pa | pb | pc | pd | pe | pf | pg | ph | r | m |

TRANSMIT FIRST → TRANSMIT LAST

LOGICAL INVERSION OF FIRST QUADLET

SELF-ID PACKET #1, #2, #3

|  | n | pa | pb | pc | pd | pe | pf | pg | ph |
|---|---|---|---|---|---|---|---|---|---|
| PACKET #1 | 0 | p3 | p4 | p5 | p6 | p7 | p8 | p9 | p10 |
| PACKET #2 | 1 | p11 | p12 | P13 | p14 | p15 | p16 | p17 | p18 |
| PACKET #3 | 2 | p19 | p20 | p21 | p22 | p23 | p24 | p25 | p26 |

FIG. 6

| | |
|---|---|
| 900h | Output Master Plug Register |
| 904h | Output Plug Control Register #0 |
| 908h | Output Plug Control Register #1 |
| ⋮ | ⋮ |
| 97Ch | Output Plug Control Register #30 |
| 980h | Input Master Plug Register |
| 984h | Input Plug Control Register #0 |
| 988h | Input Plug Control Register #1 |
| ⋮ | ⋮ |
| 9FCh | Input Plug Control Register #30 |

FIG. 7A oMPR

| data rate capability | broadcast channel base | non-persistent extension field | persistent extension field | reserved | number of output plugs |
|---|---|---|---|---|---|
| 2 | 6 | 8 | 8 | 3 | 5 (bit) |

FIG. 7B oPCR[n]

| on-line | broadcast connection counter | point-to-point connection counter | reserved | channel number | reserved | data rate | overhead ID | payload |
|---|---|---|---|---|---|---|---|---|
| 1 | 6 | 6 | 2 | 6 | 2 | 2 | 4 | 10 (bit) |

FIG. 7C iMPR

| data rate capability | reserved | non-persistent extension field | persistent extension field | reserved | number of input plugs |
|---|---|---|---|---|---|
| 2 | 6 | 8 | 8 | 3 | 5 (bit) |

FIG. 7D iPCR[n]

| on-line | broadcast connection counter | point-to-point connection counter | reserved | channel number | reserved |
|---|---|---|---|---|---|
| 1 | 1 | 6 | 2 | 6 | 16 (bit) |

FIG. 12

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| destination ID | | | | | | | | | | | | imm | | spd | | | tLabel | | | | | rt | | | tCode | | | | priority | | |
| source ID | | | | | | | | | | | | | | | | destination Offset High | | | | | | | | | | | | | | | |
| data Length | | | | | | | | | | | | | | | | destination Offset Low | | | | | | | | | | | | | | | |
| extendedTcode | | | | | | | | | | | | | | | | | | | | | | | | | | | | | | | |
| block data (Command) | | | | | | | | | | | | | | | | | | | | | | | | | | | | | | | |

INFORMATION COMMUNICATION METHOD AND APPARATUS

FIELD OF THE INVENTION

This invention relates to a communication technique and, more particularly, to a communication technique for use in serial communication employing a digital serial bus conforming to the IEEE (Institute of Electrical and Electronics Engineers) 1394 standard.

Equipment having a digital serial interface for the communication of digital data conforming to IEEE 1394 standard, such as digital video equipment, digital audio equipment or a personal computer for home use, have become popular. The IEEE 1394 standard is the standard which is well-suited to multimedia applications such as connecting consumer electronic equipment, such as digital video equipment or digital audio equipment, to a personal computer.

In the IEEE 1394 standard, transmission basically occurs over two sets of twisted pair lines. This so-called semi-duplex communication uses two sets of twisted pair lines for uni-directional transmission. Here, the so-called DS coding communication sends data and a signal called a strobe on one and the other of the twisted pair lines which are EX-ORed at the receiver to regenerate clock signals. The distance between respective nodes (or cable devices), that is the cable length, is not longer than 4.5 m.

Presently, the IEEE 1394 standard defines three data rates, namely 98.304 Mbps (S100), 196.608 Mbps (S200), and 393.216 Mbps (S400). A higher data rate equivalent to 800 Mbps (S800) is also supported by 1394b, having so-called upper compatibility, according to which an equipment accommodating a higher rate supports a node (or equipment) having a lower data rate. The lowest data rate of 98.304 Mbps (S100) is called the base rate.

Each node may have up to a maximum of 27 ports, and up to a maximum of 63 nodes can be interconnected in a network by connecting the ports of the respective nodes over the IEEE 1394 serial bus. It is noted that, although 63 nodes can be provided on a single bus according to the IEEE 1394 standard, the number of hops (or daisy-chained nodes) is prescribed not to exceed 16.

According to the IEEE 1394 standard, two different IEEE 1394 serial buses may communicate with each other by a set of nodes that are used as a bridge for linking these two different IEEE 1394 serial buses. Data is transmitted between these buses using this bridge. That is, although the number of equipment (nodes) that can be connected to a single IEEE 1394 bus is limited to a maximum of 63, a larger number of nodes can be interconnected by connecting plural buses by the bridge, thus forming a network comprising the buses and the bridge.

In the IEEE 1394 standard, bus initialization is first performed on interconnection, and tree discrimination is performed on a connection of plural nodes to produce an internal tree structure automatically. That is, tree discrimination is performed in such a manner that respective nodes that are interconnected after bus initialization are handled as a tree interconnection. Tree discrimination means that an optimum single node is selected and used as a root to which other nodes are connected as branches by way of performing route discrimination.

After tree discrimination, addresses are automatically allocated to respective nodes by 64-bit fixed addressing in accordance with the IEEEE 1212 standard, such as IEEE 1212 CSR (control and status register architecture). Of these 64 bits, the upper 16 bits (i.e. the more significant 16 bits) denote a node ID (node_ID) and can furnish a maximum node address space of 64 k. In actuality, the upper 10 bits of these 16 bits of this node_ID represent a bus ID (bus_ID) for discriminating the buses of the IEEE 1394 serial buses, with the lower 6 bits serving as the physical ID (physical_ID) for discriminating the respective nodes.

FIG. 14 of the accompanying drawings illustrates the structure of the address space of the CSR architecture. In FIG. 14, the upper 16 bits serve as a node ID for indicating the node on each IEEE 1394 bus, with the remaining 48 bits designating the address space accorded to each node. These upper 16 bits are divided into 10 bits representing the bus ID and 6 bits representing the physical ID (the physical ID is, in the narrow sense of the term, the node ID). Thus, 1023 buses and 63 nodes can be specified (the condition when all bits are "1" is reserved). Of the 256 terabyte address space, defined by the lower 48 bits of the CSR architecture, the space defined by the upper 20 of these bits is divided into an initial register space, used for 2048-byte registers that are utilized by CSR or registers that are utilized by IEEE 1394; a private space; and an initial memory space. On the other hand, if the upper 20 bits of the space defined by the remaining lower 28 bits is used as the initial register space, then the space defined by the lower 28 bits is used as a plug control register or as an initial unit space to accommodate node-specific usages.

By way of self-discrimination, each node selects the physical ID used in the address to generate management information concerning bus connection. This management information is used for low-level power management or system topology construction. For self-discrimination, the physical ID or the management information is included in the self ID (self_ID) packet and sent together. The number of self-ID packets depends on the number of ports such that up to a maximum of 4 packets are transmitted from a single node. The physical ID depends upon the number of times the self ID is exchanged. For example, if the node which sends the self ID packet first adopts 0 as the physical ID, that node next sets the physical ID to 1 and so on to select sequential numbers. The self-recognition process begins at a root node; and the root node hands over control of a lower node in an increasing order of the port numbers. The root node waits until the lower node allocates its own self ID to transmit ident_done to the root node. On reception of the ident_done, the root node hands over control to the next node. When the numbers of all the communicating nodes are determined, the number of the root node itself is determined. The same applies for lower nodes.

In the IEEE 1394 standard, signals transmitted by a given node are relayed by another node so that signals which contain the same content are broadcast to all of the nodes in the network. In order to prevent disorderly transmission/reception, each node has to arbitrate rights to use the bus before commencing transmission. To obtain rights to use the bus, each node waits for the bus to be opened and sends a signal to a master unit on a tree requesting the right to use the bus. The master unit, on reception of the request signal, relays the request signal to a further master unit, until the request signal ultimately reaches a control node which functions as the uppermost unit (root). The control node (root) on reception of the request signal returns a use permission signal. The node which has thus acquired permission (termed a controlled node or a target) now is able to carry out communication. If request signals are issued simultaneously from plural nodes, a permission signal is accorded to only one node, and the other requests are refused. Thus, plural nodes use a single bus in a time-division multiplexed fashion as the nodes compete with one another for rights to use.

The structure of the IEEE 1394 serial bus is made up of layers: a transaction layer, a link layer and a physical layer. The transaction layer sends data or commands, as instructed by an application, to a lower link layer. The transaction layer uses the protocol of request and response in order to execute a read/write/lock transaction, as determined by IEEE 1212 CSR (control and status register). In the read transaction, an initiator equipment reads out the IEEEE 1212 address space of a specified address of a target equipment. The read transaction relies on quadlet-based read-in and block-based read-in, wherein a quadlet is a 4-byte-based data unit in the IEEE 1394 standard and a block is a unit of not less than one quadlet. In a write transaction, an initiator equipment writes data in the IEEEE 1212 address of a target equipment. The write transaction relies on quadlet-based writing and block-based writing. In the lock transaction, an initiator equipment transfers data to the target equipment. This data is processed, such as by swapping, in combination with data of the specified address of the target equipment to introduce data to the specified address of the target equipment.

The link layer exchanges data with the transaction layer to execute semi-duplex data packet allotting. The link layer also executes address allocation, data check and data frame division.

The physical layer converts the logical signals used by the link layer into electrical signals.

Consistent with the IEEE 1394 standard, isochronous data transfer is defined as synchronous data transfer. In isochronous data transfer, the right of priority is allocated cyclically, for example, every 125 µs, thus enabling data transfer with real-time characteristics. In order for a pre-set node to perform isochronous data transfer, the node needs to perform the isochronous function, while at least one of the nodes associated with the isochronous function needs to perform a cycle master function. Moreover, at least one of the nodes connected to the IEEE 1394 bus needs to function as an isochronous resource manager. This isochronous resource manager executes allotting of isochronous bandwidth and channel numbers and cycle master designation.

The IEEE 1394 standard also provides asynchronous, or non-synchronous, data transfer. In asynchronous data transfer, although transmission timing is not constant, positive transmission is assured by employing acknowledge and retry handshaking.

Data is transmitted as packets; and the process of transmitting packets is termed a sub-action. Isochronous sub-action transfers packets by isochronous data transfer and asynchronous sub-action transmits packets by asynchronous data transfer. Each sub-action is divided into three portions, namely an arbitration sequence, data packet transmission and acknowledgement.

In an arbitration sequence, the node that wishes to transmit packets requests the physical layer to obtain bus control rights; and arbitration ultimately accords control rights to a node. The node which has acquired control rights is able to transmit a data packet. In data packet transmission, a data packet includes a data prefix (data_prefix) that includes a speed code, addresses of the transmitting and receiving sides, transaction codes (transaction_code: TCODE), a transaction label which identifies the type of transaction, and a retry code (retry_code), these being collectively termed a header, and a main data portion. In addition, one or more CRC (cyclic redundancy code), packet termination code (packet_termination, which is either data_prefix or data_end) etc. also are transmitted.

The data_prefix is simpler for an isochronous sub-action than for asynochronous data transfer. The isochronous sub-action uses a channel in place of an address and is free from transaction labels or retry codes. The transaction code defines the packet types of the main packets; and an isochronous packet is demarcated from an asynchronous packet by the value of the transaction code.

In an acknowledgement, a response is made from the receiving side node to the transmitting side node, to the effect that an operation has been effectuated. For an asynchronous packet, the receiving node returns to the transmitting node the code indicating the packet reception state (success or failure). The data transmitted in the acknowledgement is in the form of a data packet. Ahead and in back of the acknowledgement code are appended a data prefix indicating the beginning of data and a data end (data_end), respectively. No acknowledgement is returned to a broadcast packet, whether transmitted as an isochronous packet or as an asynchronous packet.

In an asynchronous sub-action, a variable volume of data and header information of a few bytes indicating the information on the transaction layer are sent to the specified node. The node which receives this data necessarily returns a response (the acknowledgement). Specifically, the asynchronous sub-action (ASA) is made up of an arbitration time AT, the data prefix (data_prefix) DP, a packet P, data end (data_end), a data prefix DP, an acknowledge packet acP and data end DE, with each asynchronous sub-action ASA having a sub-action gap SG, as shown in FIG. 15. An acknowledge gap AG is a gap between a data packet transmitted by a transmitting node and a response packet acP, which is an acknowledgement thereof. The length of the acknowledge gap AG changes with the status of the bus and is set so as to be sufficiently shorter than the length of the sub-action gap SG, in order to prevent other nodes in the network from initiating arbitration before acknowledge reception. A gap is a period of idle bus states demarcating the packets.

In this manner, the IEEE 1394 protocol is managed by the gaps, such that, if an idle state is identified as continuing for longer than a pre-set time period, a node that wishes to transmit data initiates arbitration. The gap is specified by the physical layer (PHY) register of the IEEE 1394 protocol.

Referring to FIG. 16, in an isochronous sub-action (ISA), isochronous packets are transmitted to the entire bus at regular intervals, using channel addresses, without transmitting packets to a specified node. Specifically, the isochronous sub-action ISA information for plural channels chJ, chK, chL, . . . , is made up the arbitration time AT, a data prefix DP, a packet P and data end DE for each channel. The channels chJ, chK, chL, . . . , are separated from each other by an isochronous gap IG that is set to be sufficiently smaller than the sub-action gap SG of the asynchronous sub-action.

Arbitration in an asynchronous sub-action or in an isochronous sub-action is a sequence whereby each node acquires the rights to use a serial bus. This arbitration is divided into asynchronous arbitration and isochronous arbitration, in association with the asynchronous data transfer and the isochronous data transfer, respectively. Asynchronous arbitration accords access rights of the highest priority to a cycle master node managing a clock source that is common to the buses to effect isochronous data transfer without disturbing the basic arbitration protocol. The cycle master node transmits a special timing request, termed a cycle start. Isochronous arbitration takes place when a link layer is about to transmit data.

There are two types of asynchronous arbitration, namely a fair or equal arbitration and an urgent arbitration. Fair arbitration assures equal bus access for each node desiring transmission. With this arbitration, it is possible to prevent a node from having priority on a bus. Urgent arbitration supports a node in need of using the bus frequently and exhibiting a smaller latency.

FIG. 17 shows the structure of the arbitration and the structure of a cycle during which data is transmitted. An isochronous gap IG initiates isochronous arbitration and is set to be shorter than the sub-action gap SG of the asynchronous arbitration. The isochronous gap IG is usually set to the smallest width of those gaps that are used. As may be seen from FIG. 17, the node transmitting isochronous data has a faster cycle start than the node transmitting asynchronous data, such that, when arbitration is successful, the isochronous packet is transmitted virtually instantly. As may also be seen, a 6-bit channel number (ch) is used as a label in place of the node number. This channel number is not pertinent to the node priority sequence nor to the packet transmission sequence. When all of the nodes that wish to transmit isochronous data complete their data transmission, the bus is in an idle state for a time period sufficient to be recognized as a sub-action gap SG. Subsequently, asynchronous arbitration is started.

In isochronous communication, the communication bandwidth is secured to effect communication by time division multiplexing bandwidth allocation units. Referring to FIG. 18, the bandwidth BW of the isochronous communication is made up of an isochronous gap IG, the arbitration time AT, a data prefix DP, a packet P, a data end DE and propagation time PT. The arbitration time AT or the propagation time PT are parameters affected by the length of the signal transmitting cable (that is, the number of hops along the cable length). At present, the arbitration time AT and/or the propagation time PT are calculated based on the assumption that the maximum number of hops that theoretically may be provided on the IEEE 1394 serial bus are used. Once this arbitration time AT and/or propagation time PT are set, the bandwidth BW needed to effect asynchronous data transfer is determined by the isochronous resource manager (IRM).

The methods used to calculate the arbitration time AT or the propagation time PT are indicated by the following equations (1) and (2). In these equations, DT is the decision time, MHN is the maximum number of usable hops, CL is the cable length, CD is the cable delay, and PD is the physical delay (PHYdelay). The decision time DT is the time necessary for a root node to execute calculations and the maximum number of hops MHN is 16, with the cable length CL being the maximum length, or 4.5 m. The cable delay CD is expressed by the differential propagation speeds VTPA and VTPB of signal pairs by a set of twisted pair lines TPA, TPB, where VTPA≈5.05 ns/m and VTPB≈5.05 ns/m. The physical delay is the repeater delay in the worst case, and is set to not larger than 144 ns for the lowest base rate of 98.304 Mbps (S100) among the data rates normally provided in the IEEE 1394 standard.

$$PT = MHN \times CL \times CD + MHN \times PD \quad (1)$$

$$AT = 2PT + DT \quad (2)$$

The transmitting node secures the bandwidth BW from the isochronous resource manager (IRM), using the parameters PT and AT calculated by equations (1) and (2), to execute isochronous data transfer.

In asynchronous data transfer, no bandwidth is acquired, as opposed to isochronous data transfer; however, a gap (or signal-less) period is provided to perform data transfer, in order to assure fair arbitration as shown in FIG. 19. An arbitration reset gap (ARG) is a function of the number of hops. The arbitration reset gap ARG and the sub-action gap SG are parameters affected by the length of the signal transmitting cables (number of hops cable length), as in the case of the isochronous data transfer.

The calculation of the arbitration time AT or the propagation time PT in isochronous data transfer is based on the assumption that the maximum number of hops, which is equal to 16, is provided on the IEEE 1394 serial bus, even if a lesser number of hops actually is used. Thus, if a number of nodes (cables) are not connected to the bus, there is nevertheless, secured a bandwidth corresponding to the maximum number of hops, with the result that system resources cannot be utilized effectively.

So too is the problem for asynchronous data transfer in which the calculation of the arbitration reset gap ARG and the sub-action gap SG is based on the assumption that the maximum number of hops, which is equal to 16, are provided on the IEEE 1394 serial bus. Thus, if a number of nodes (cables) are not connected to the bus, the gaps that are determined nevertheless correspond to the maximum number of hops, with the result that resources cannot be utilized effectively.

OBJECTS OF THE INVENTION

Therefore it is an object of the present invention to provide an information communication technique in which the bandwidth of the isochronous data transfer (overhead dependent on bus topology) and the signal-less period (gap) of the asynchronous data transfer are suppressed to minimum values to achieve effective utilization of resources.

Another object of the invention is to provide a technique for IEEE 1394 information communication that improves the efficiency of data transfer.

SUMMARY OF THE INVENTION

The present invention provides an information communication technique in which information communication is performed between a plurality of nodes connected to a bus, wherein a value corresponding to the number of connections between respective nodes is determined, and pre-set communication parameters (for example, arbitration time, or propagation time or arbitration reset gaps) are calculated based on that determined value.

It is a feature of the present invention to exploit the relationship that the node ID (node_ID) of a root node of the IEEE 1394 standard is equal to the maximum number of hops on a bus, in order to calculate the pre-set communication parameters solely as a function of the number of connections between the nodes. This reduces the dependence on bus topology to determine bandwidth in isochronous data transfer as well as to decrease the non-signal period (gap) in asynchronous communication.

BRIEF DESCRIPTION OF THE INVENTION

FIG. 2 illustrates the format of a bandwidth available (BANDWIDTH_AVAILABLE) register, for the purpose of allocating isochronous bandwidth;

FIG. 4 illustrates a field of a self-ID packet;

Figure 5:
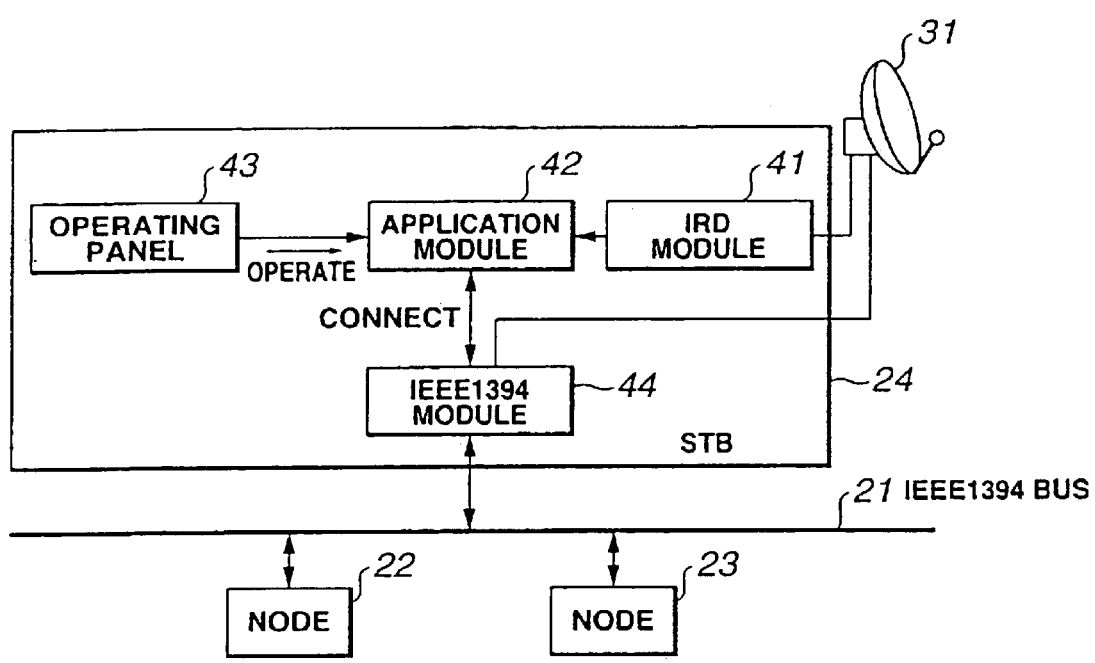
FIG. 5 shows one example of a system embodying the present invention.
Figure 8:
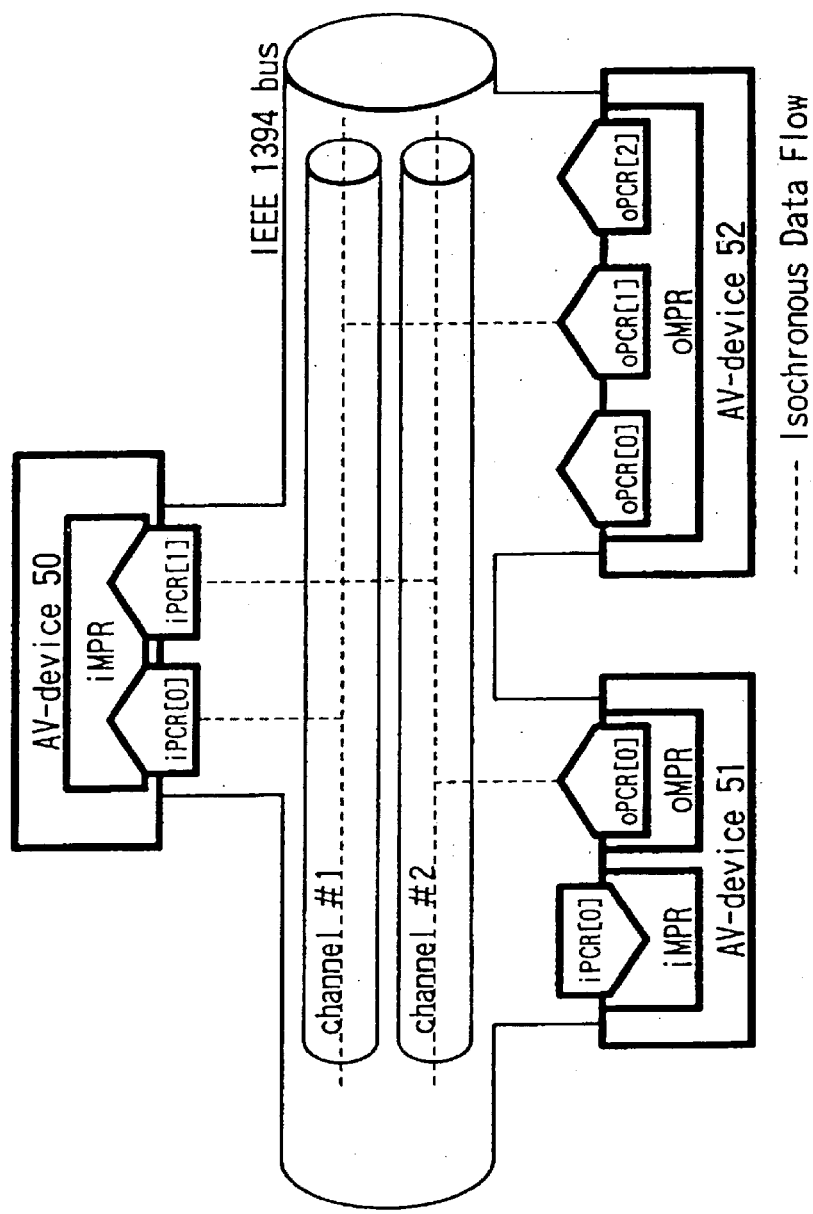
Figure 9:
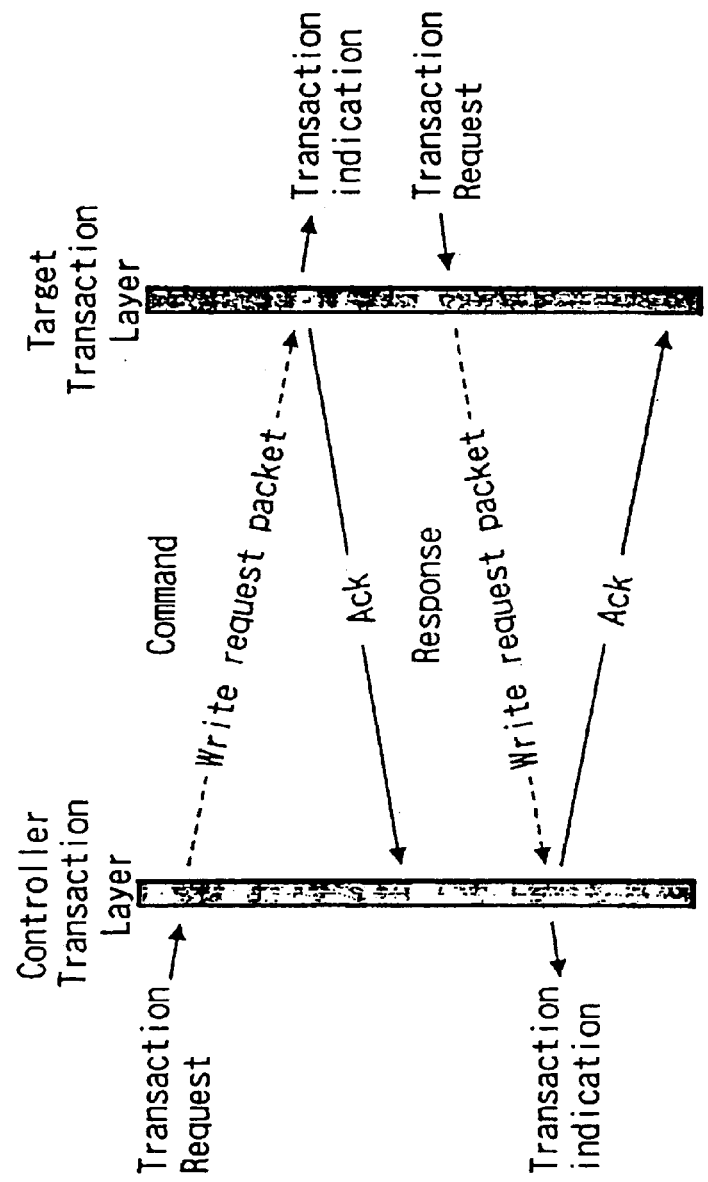
Figure 10:
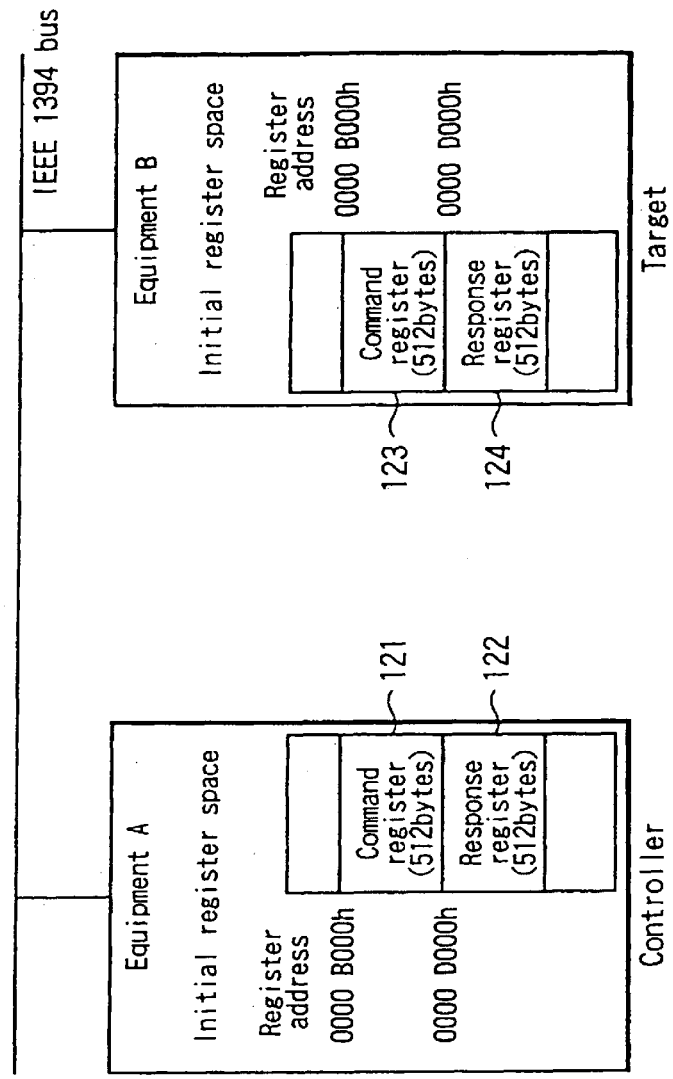
Figure 11:
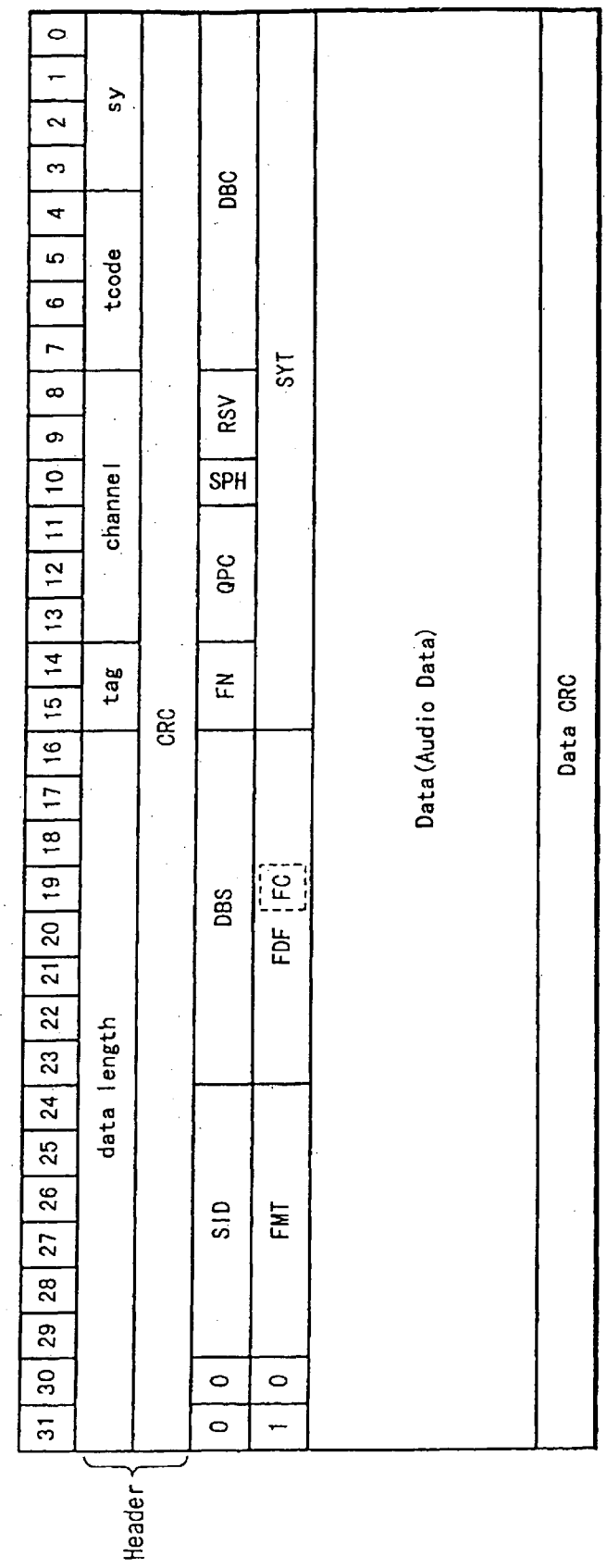
Figure 13:
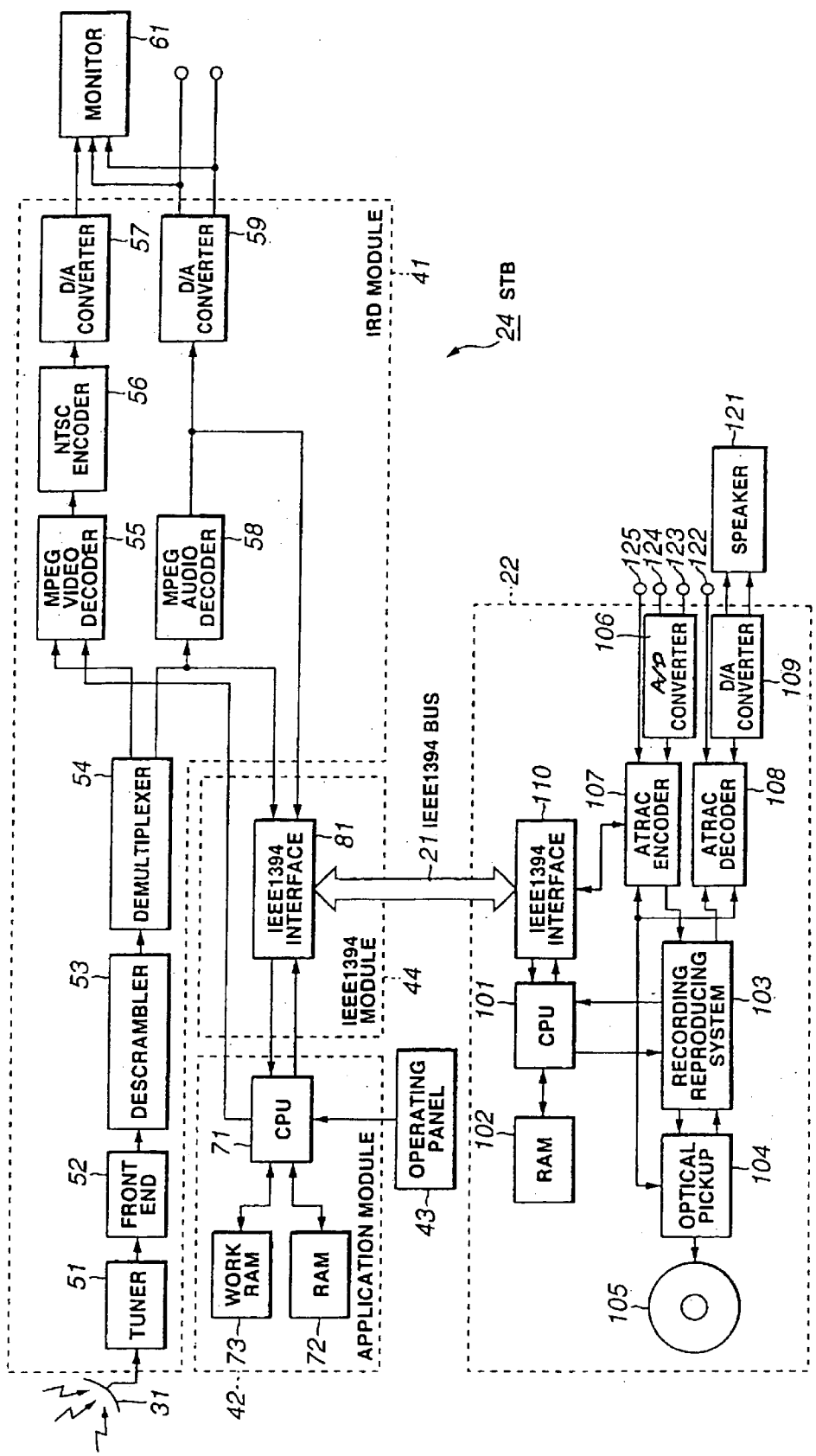
Figure 14:
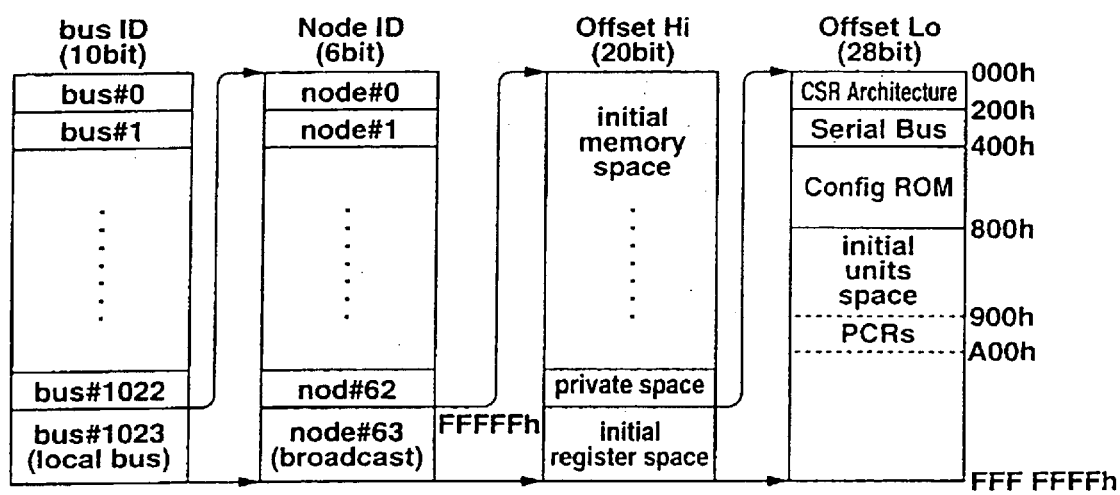
Figure 15:
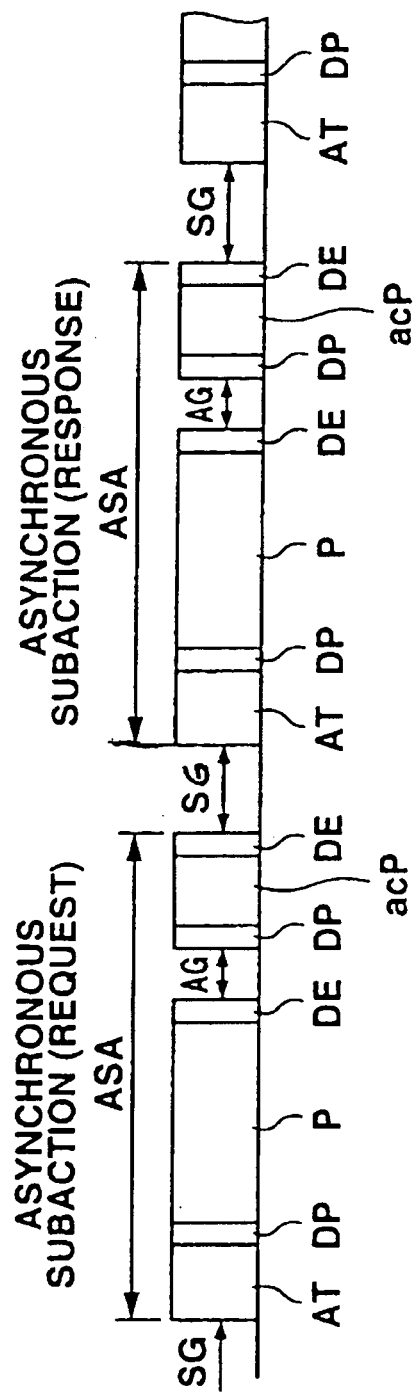
Figure 16:
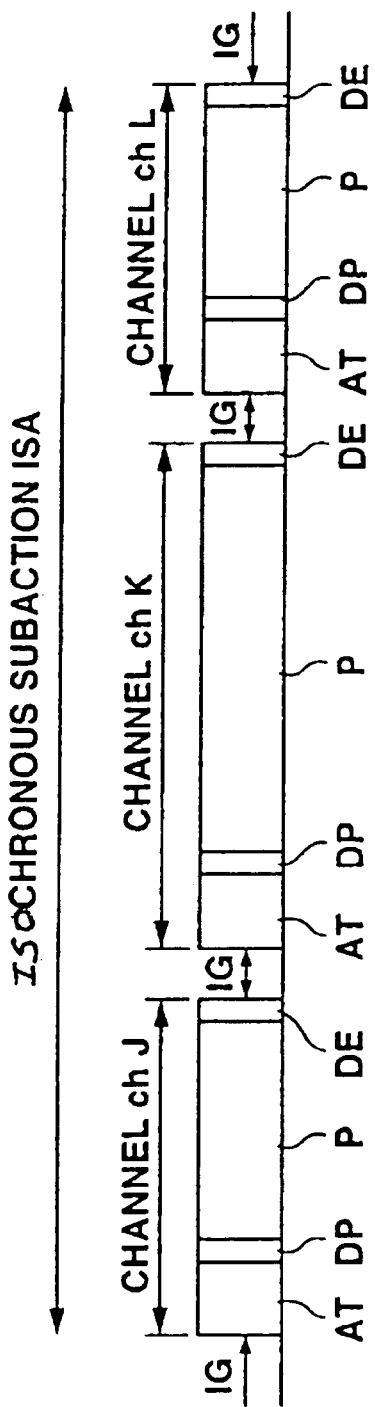
Figure 17:
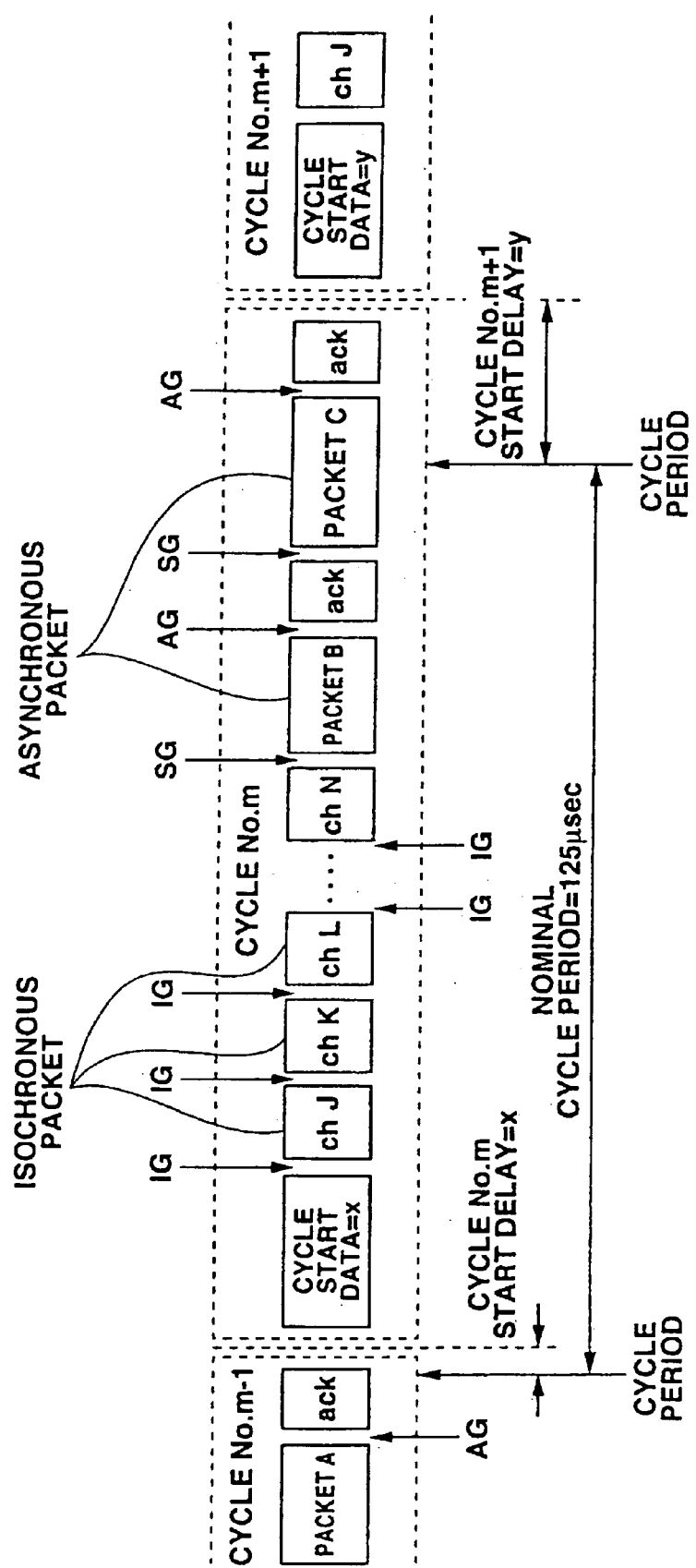
Figure 18:
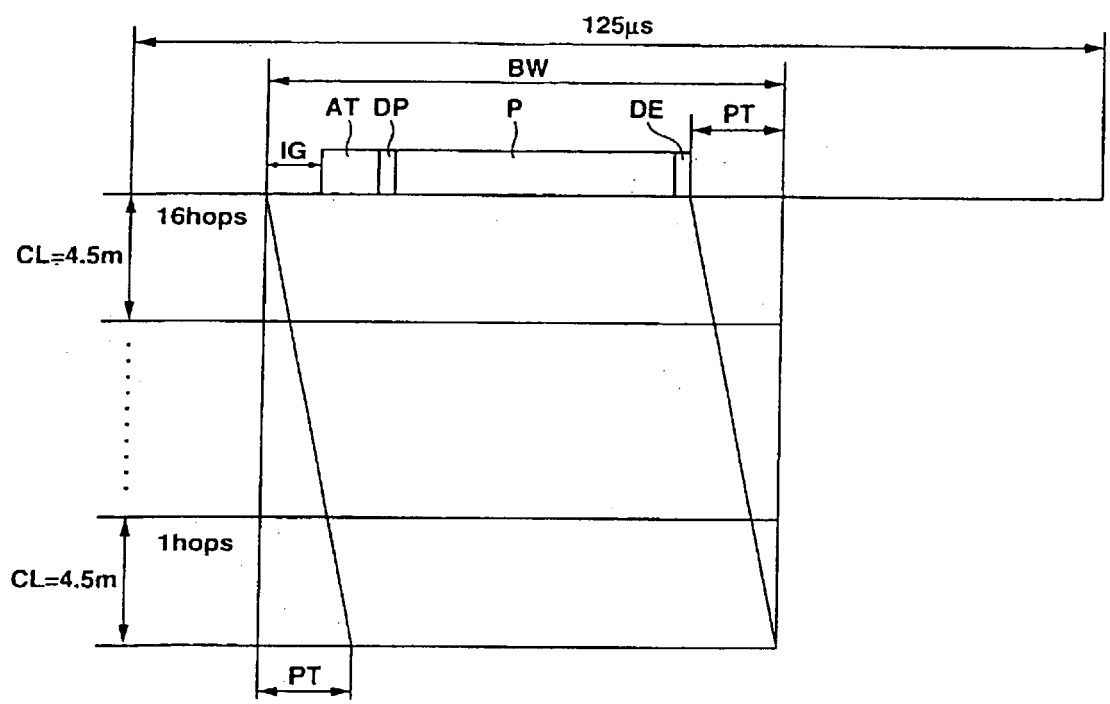

FIG. 6 schematically illustrates a plug control register;

FIGS. 7A–7D illustrate the structure of the registers that comprise the plug control register;

FIG. 8 schematically illustrates the plug connections of nodes interconnected by the IEEE 1394 serial bus;

FIG. 9 schematically illustrates asynchronous communication of command and response;

FIG. 10 illustrates in more detail the command/response protocol of FIG. 9;

FIG. 11 schematically illustrates an isochronous transfer packet;

FIG. 12 schematically illustrates an asynchronous transfer packet;

FIG. 13 is a block diagram showing the structure of set top box 24 and node 22 of FIG. 5;

FIG. 14 illustrates the address space of the control and status register (CSR) architecture in the IEEE 1394 standard;

FIG. 15 illustrates typical asynchronous sub-actions;

FIG. 16 illustrates a typical isochronous sub-action;

FIG. 17 illustrates the structure of the arbitration and the structure of a cycle in the IEEE 1394 standard;

FIG. 18 illustrates the bandwidth in a cycle of isochronous data transfer; and

Figure 19:
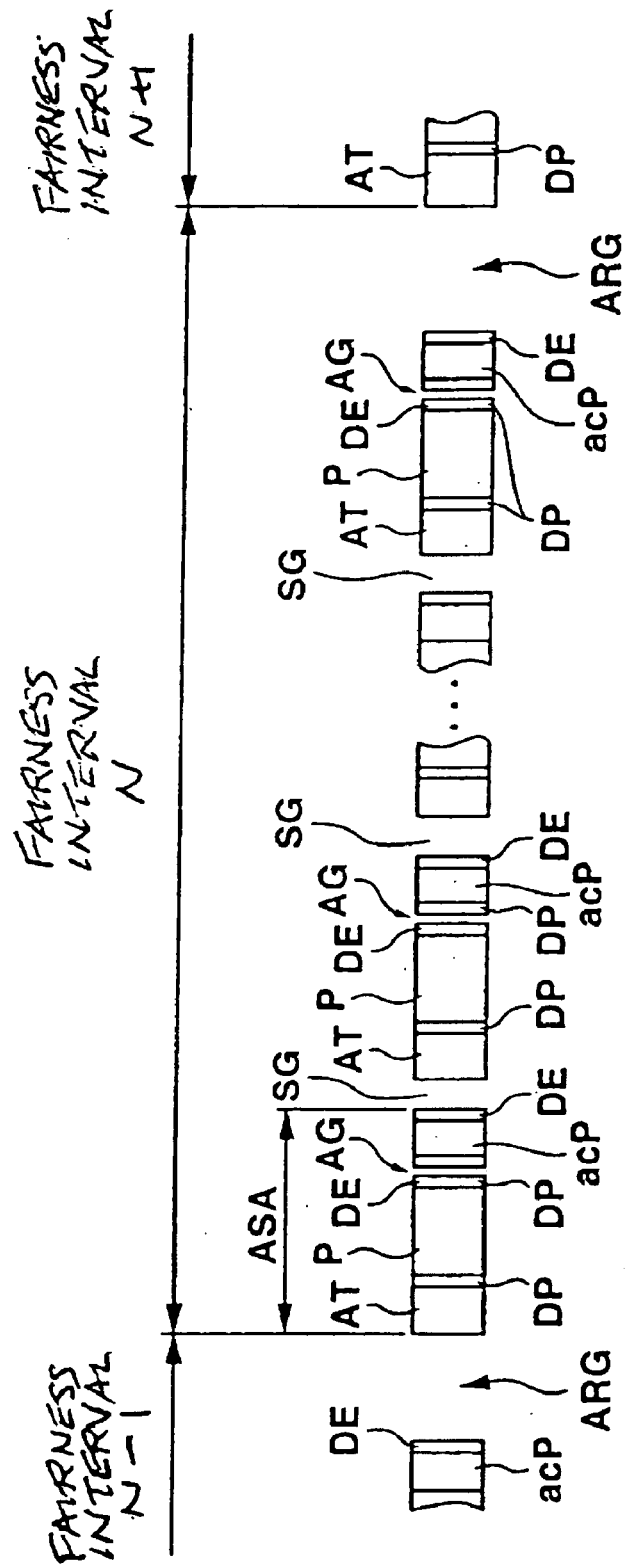

FIG. 19 illustrates a fairness interval of isochronous data transfer.

DETAILED DESCRIPTION OF A PREFERRED EMBODIMENT

Referring to the drawings, a preferred embodiment of the present invention now will be explained in detail.

Figure 1:
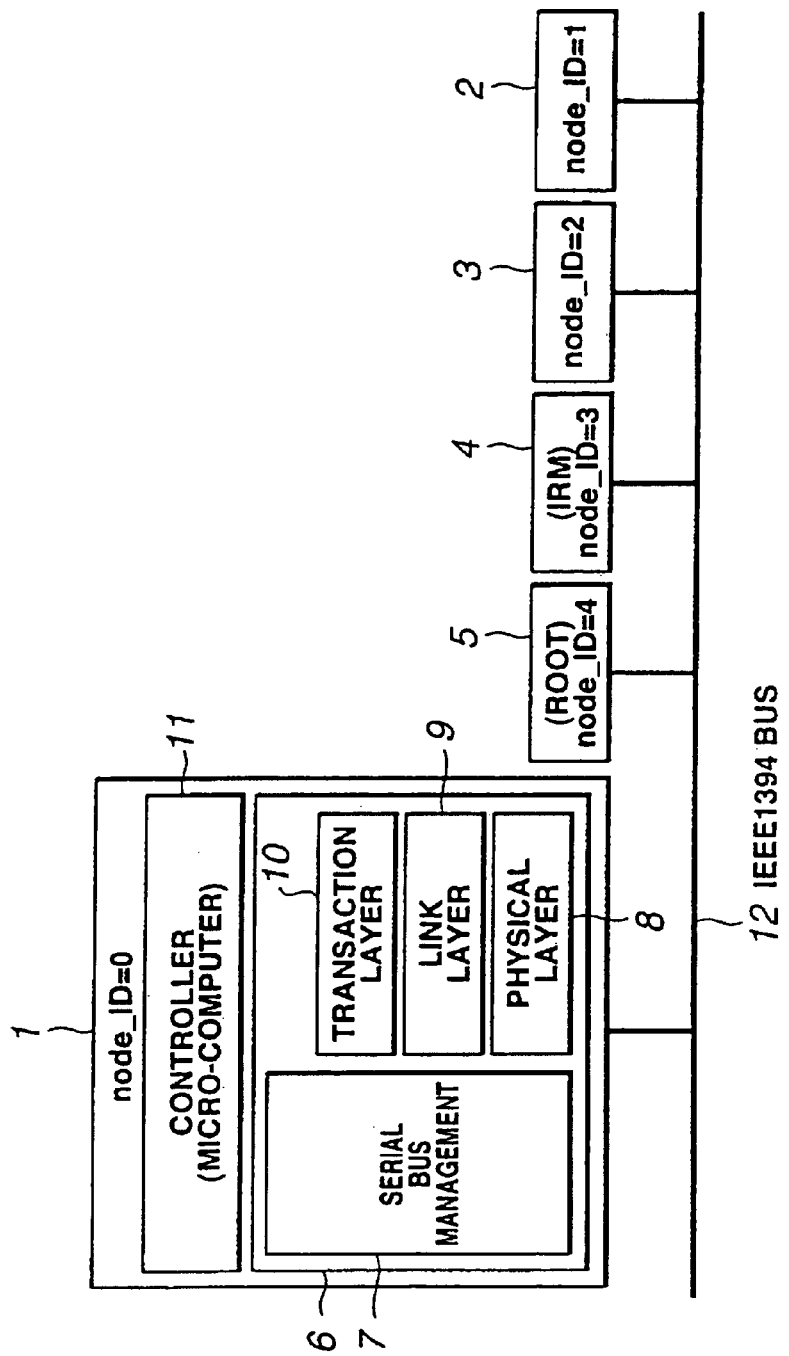
FIG. 1 shows a system configuration consistent with the IEEE 1394 standard and in accordance with the present invention.

FIG. 1 illustrates an embodiment of a system for executing serial communication using the IEEE 1394 standard. Plural nodes, for example, nodes 1 to 5, are connected on the IEEE 1394 serial bus. It is assumed that, in the configuration shown in FIG. 1, bus initialization, tree discriminating, address allocation and self-identification (known to those of ordinary skill in the IEEE art) have already been completed. In the example of FIG. 1, "0", "1", "2", "3" and "4" are allocated to the nodes 1 to 5, as node IDs (node_ID), respectively. One example of the procedure used to allocate node IDs is described in the Appendix attached hereto and made a part hereof. Let it be assumed that node 5 becomes a root node and that node 4 functions as an isochronous resource manager (IRM). Each of nodes 1 to 5 includes an IEEE 1394 interface 6 and a controller 11 comprised of a micro-computer, as shown for node 1. The IEEE 1394 interface 6 includes a physical layer processing unit 8, a link layer processing unit 9, a transaction layer processing unit 10 and a serial bus management processing unit 7. In general, the physical layer processing unit 8 and the link layer processing unit 9 are included in hardware; and the transaction layer processing unit 10 and the serial bus management processing unit 7 are included in firmware.

The physical layer processing unit 8 converts electrical signals, inputted over an IEEE 1394 bus 12, into logical signals used in the link layer processing unit 9 at the downstream (or receiving) node. The link layer processing unit 9 performs the usual processing, such as address allocation, data check or data framing, on data supplied from the physical layer processing unit 8. The link layer processing unit exchanges data with the transaction layer processing unit to execute half-duplex data packet allotting. The link layer processing unit also sends data from the physical layer processing unit to the controller 11.

The transaction layer processing unit 10 transmits data or commands (as instructed by a communication application) to the link layer processing unit 9. The transaction layer processing unit uses a request response service protocol in order to execute a read/write/lock operation as requested by the control and status register (CSR) of IEEE 1212.

The serial bus management processing unit 7 performs comprehensive management as it communicates with the transaction layer processing unit 10, link layer processing unit 9 or physical layer processing unit 8. The serial bus management processing unit has a configuration ROM for node discrimination and a register for management; and functions as a bus manager, an isochronous resource manager or a node controller. In the example of FIG. 1, the serial bus management processing unit of node 4 functions as the isochronous resource manager.

The node operating as the isochronous resource manager, node 4 in the example shown in FIG. 1, includes a bandwidth available (BANDWIDTH_AVAILABLE) register of the format shown in FIG. 2. The bandwidth available register furnishes a "previously known" data saving area in order for the isochronous resource manager to allocate the isochronous bandwidth or to cancel the allocation. The contents of the writable 13-bit bw_remaining field in FIG. 2 indicate the amount of isochronous bandwidth that can currently be used (i.e. is available) for allocation. This amount of bandwidth is expressed in terms of time units, referred to as the bandwidth allocating units. The initial value of the bw_remaining field is equal to the maximum value of 100 μs of the isochronous traffic, that is 4915 bandwidth allocation units.

Figure 3:
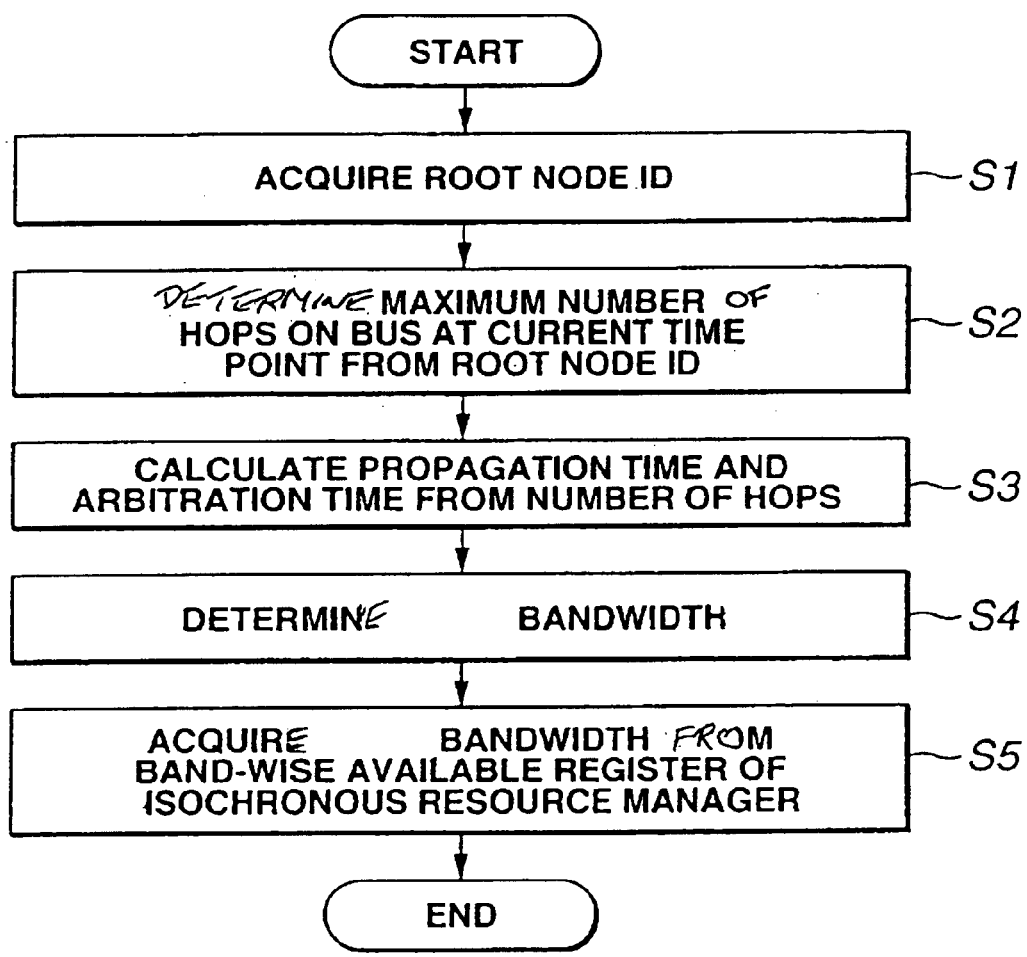
FIG. 3 is a flowchart for illustrating the acquisition of bandwidth in a system embodying the present invention.

The manner in which bandwidth is acquired is explained in conjunction with the flowchart of FIG. 3. The following explanation assumes that node 1, for example, acquires the bandwidth as a transmitting node. At step S1, the IEEE 1394 interface 6 acquires the node ID of the root node; and controller 11 acquires the node ID of the root node from the IEEE 1394 standard interface.

The root node ID is known from the self ID packet transmitted from each node after e.g., bus resetting. In particular, the root node is the node that broadcasts the self ID packet last; so, the root node ID is known simply from the physical ID (which identifies the physical node of the sender of the packet) of the last-broadcasted self ID packet. FIG. 4A shows the self ID packet where the node has three or less ports; and FIG. 4B shows the self ID packet where the node has four or more ports. In the self ID packets, the field, "10" identifies the packet as the self ID packet, the field "phy_ID" is the physical node identifier of the sender of this packet. The field "L" indicates the presence of an active link layer and an active transaction layer at the node if this field is set. The field "gap_cnt" denotes the current value of the PHY_CONFIGURATION of this node. The field "sp" denotes the associated speed capability of the physical layer. The field "del" is the physical delay (PHYdelay) of the node. The field "c", if set and if a flag is set in the L-field, means that this node participates in a competition for bus manager or isochronous resource manager. The field "pwr" indicates power consumption and supply characteristics of the node (e.g. whether the node needs power, or is self-powered and provides a quantity of power to the bus, or whether the node is powered from the bus and needs additional power for other layers). The field "i", if set, indicates that this node has executed the bus reset operation. The field "m", if set, indicates that one more self ID packet for this node follows. The field "n" (FIG. 4B) denotes the extended self ID packet sequence number. The fields "r", "rsv" denote that these fields are reserved for future use.

Returning to the flow chart of FIG. 3, at step S2, the controller 11 uses the root node ID, which is the phy_ID of the last-broadcasted self ID packet to find the actual number of hops present on the IEEE 1394 serial bus. The number of hops is equal to the number of cables interconnecting respective nodes on the bus. If five nodes from node 1 to node 5 are connected on the bus as shown in Fig. I, the number of cables connecting these nodes is four, so that the number of hops is also four. The node IDs of those nodes on the bus are numbered sequentially from 0, so that, when five nodes are connected on the bus as shown in FIG. 1, the last node ID, that is the node ID of the root node, is node_ID=4. It may be seen from this that the number of hops on the bus is equal to the node ID of the root node, so that the controller 11 is able to determine the number of hops simply from the root node ID.

If isochronous data transfer is to be performed, the controller 11, at step S3, uses the number of hops determined from the root node ID to calculate the arbitration time AT and the propagation time PT in order to acquire, that is receive allocation of, the bandwidth BW of the isochronous data transfer as explained in connection with FIG. 18. Propagation time is calculated in accordance with the following equation:

$$PT = HN \times CL \times CD + HN \times PD \qquad (3)$$

and arbitration time is calculated as follows:

$$AT = 2PT + DT \qquad (4)$$

In equations (3) and (4), DT is the decision time, that is, the time needed to effect calculations, HN is the number of hops, as found from the node ID of the root node, CL is the cable length, CD is the cable delay and PD is the physical delay. The decision time DT is the time required by the root node to execute calculations, assuming that the number of hops HN is 4 (as found from the root node ID being 4 in the example of FIG. 1), and assuming that the cable length CL is the maximum length or 4.5 m. The cable delay CD is expressed by the differential propagation speed VTPA and VTPB of the signal pair by the set of twisted pair lines TPB and TPB, with VTPA≈5.05 ns/m and VTPB≈5.05 ns/m, and the physical delay is 144 ns.

At step S4 the controller determines the bandwidth BW that is to be used, as a function of the calculated propagation time PT and the calculated arbitration time AT. Then, at step S5, the desired bandwidth is acquired from or allocated by the bandwidth available register of the isochronous resource manager (see FIG. 2). Bandwidth allocation management for isochronous data transfer is handled by the isochronous resource manager of node 4 in FIG. 1. Thus, the transmitting node secures the acquired bandwidth to perform the isochronous data transfer.

With the present embodiment, as described above, the bandwidth that is acquired is based on the actual number of hops present on the current bus, rather than being based on the maximum number of hops (i.e. 16 hops) that theoretically can be present on the current bus. Thus, overhead (which is reflected in the acquired bandwidth) and that is dependent on the bus topology, is reduced to assure effective utilization of resources, that is 4915 bandwidth allocation units may be communicated in the isochronous traffic.

Likewise, if asynchronous data transfer is to be performed by the present invention, a procedure similar to that performed for isochronous data transfer is followed to minimize the size of the signal-less periods, or gaps. That is, in computing the gaps for asynchronous data transfer, the gaps are determined based on the node ID of the root node. The bus manager or the isochronous resource manager sets the gap in each of the nodes. This avoids the risk of using large gaps, that otherwise would be based on the assumption that the maximum number of hops usable on the bus, that is 16 hops, are used when, in fact, a lesser number of hops actually are present. Thus, unneeded gaps may be deleted and only the necessary minimum gaps are secured to assure effective utilization of resources.

FIG. 5 shows an example of an IEEE 1394 bus system with which the present invention finds ready application. In this illustrative example, a node 22, which is for instance a piece of audio equipment such as a magneto-optical disc device, a node 23 operating as an isochronous resource manager, and a set top box (STB) 24, operating as a controller, are connected to IEEE 1394 bus 21. The set top box 24 receives electromagnetic waves broadcasted from a satellite (not shown) over a parabolic antenna 31, to output signals corresponding to the received electromagnetic waves to an integrated receiver/decoder (IRD) module 41 which demodulates the signals supplied from the parabolic antenna. An application module 42 controls the IRD module 41 and it also controls an IEEE 1394 module 44 in response to user-generated commands when a user acts on an operating panel 43 of a remote controller or of the set top box 24. The IEEE 1394 module 44 executes interface processing for the IEEE 1394 bus 21.

To control the input and output of each piece of equipment connected to the bus, each piece of equipment has a PCR (Plug Control Register) shown in FIG. 6, which supports a plug having signal paths logically similar to an analog interface. The PCR has an oPCR (output Plug Control Register) representing an output plug, an iPCR (input Plug Control Register) representing an input plug, an oMPR (output Master Plug Register) and an iMPR (input Master Plug Register) indicative of information on the output plug or the input plug unique to each piece of equipment. Each piece of equipment does not have a purality of oMPRs and iMPRs, but does include a plurality of oPCRs and iPCRs corresponding to each individual plug. The PCR shown in FIG. 6 has thirty-one oPCRs and thirty-one iPCRs. The flow of isochronous data is controlled by operating the register corresponding to these plugs.

FIG. 7A shows the structure of the oMPR; FIG. 7B shows the structure of the oPCR; FIG. 7C shows the structure of the iMPR; and FIG. 7D shows the structure of the iPCR. The two-bit section representing data rate capability of the oMPR and the iMPR indicates the maximum transmission speed of isochronous data which can be transmitted or received by that piece of equipment. The six-bit broadcast channel base of the oMPR identifies the channel number used to broadcast an output.

The five-bit number of output plugs of the oMPR stores a value indicating the number of output plugs provided in the piece of equipment, namely, the number of oPCRs. The five-bit number of input plugs of the iMPR stores a value indicating the number of input plugs provided in the relevant piece of equipment, namely, the number of iPCRs. The non-persistent extension field and the persistent extension field are used for future extension.

The on-line bit (MSB) in the oPCR and in the iPCR represents the state of use of the plug: "1" indicates that the plug is on-line and "0" represents that the plug is off-line. The value of the broadcast connection counter of the oPCR and the iPCR indicates whether the broadcast connection is present (1) or not (0). The value of the six-bit point-to-point connection counter of the oPCR and the iPCR indicates the number of point-to-point connections from the relevant plug. The six-bit channel number of the oPCR and the iPCR indicates the isochronous channel number to which the relevant plug is connected. The two-bit data rate in the oPCR indicates the actual transmission speed of isochronous data packets output by the relevant plug. The four-bit overhead ID of the oPCR represents the overhead bandwidth for isochronous communication. The ten-bit payload of the oPCR represents the maximum amount of data contained in an isochronous packet that the relevant plug can handle.

FIG. 8 shows the relationship between a plug, the plug control register and the isochronous channel. AV (audio/video) devices 50, 51 and 52 are connected to each other by means of the IEEE 1394 serial bus. Isochronous data whose channel is specified by, for example, oPCR [1] and whose transmission speed of AV-device 52 are defined, is sent out to channel 1 of the IEEE 1394 serial bus. AV-device 50 reads and stores the isochronous data sent on channel 1 of the IEEE 1394 serial bus. Likewise, AV-device 51 sends out 1 5 isochronous data to channel 2, which is specified by oPCR [0], and AV-device 50 reads the isochronous data from channel 2, as specified by iPCR [1], and stores it.

FIG. 9 illustrates the control command and the response transmitted asynchronously. As shown in FIG. 9, the controlling node is indicated as the controller and the controlled node is indicated as the target. Transmission of the control command or transmission of the response is performed between pieces of equipment using Write Transaction of asynchronous transmission in IEEE 1394. The target which receives data returns an acknowledgement (ACK) to the controller for confirming reception.

FIG. 10 illustrates in more detail the relation between the control command and the response shown in FIG. 9. A piece of equipment A is connected with a piece of equipment B through the IEEE 1394 bus. Equipment A is the controller and equipment B is the target. Equipment A and equipment B both have a command register and a response register, each of which has 512 bytes. As shown in FIG. 10, the controller communicates a command by writing a command message into the command register 123 of the target. Conversely, the target communicates its response by writing a response message into the response register 122 of the controller. Control information is thus exchanged by the two messages that make a pair.

FIG. 11 is a diagram showing a portion of the isochronous transfer packet used for isochronous transfer. A header is assigned to this packet, which occupies 32×2 bits or two quadlets, and includes the synchronising pattern sy, the packet code tcode, the channel, a tag and data length. The second quadlet is the error correction code CRC. To the next 32-bit quadlet are assigned the count value of successive packets DBC when data of a fixed size are divided into respective packets, reserved data RSV, a marker SPH indicating whether there is a source packet header or not, a divisional number of source packet FN, a data block size DBS, the identification code of its own self-ID SID and so on. The next 32-bit quadlet contains a recording area SYT such as a time stamp, a sampling fequency FDF of the transmitted data, a representation of the transmission format FMT and so on. The next data area contains the transmitted data from the source, having 32 bits as a unit. The error correction code CRC is added to the end of this source data.

As shown in FIG. 11, one bit at a specific poistion in the 8-bit sampling fequency FDF area (at the position shown in broken lines) is used for adding a flag FC indicating that the transmission rate of the audio data is being controlled. If this flag FC is "1", it indicates that the transmission rate is controlled. If the flag FC is "0", it indicates that the transmission rate is not controlled.

FIG. 12 is a diagram showing an asynchronous transfer packet. In the first 32-bit quadlet are provided the priority level of this packet (priority), the code of this packet (tCode), the retry code of this packet (rt), the label assigned to this packet (tLabel), the transmission speed (spd) and Identification data indicating the relationship with successive packets (imm). The packet also includes data specifying an address of the destination node (destination offset high, destination offset low), data indicating the destination node and bus (destination ID), and data length of the transmission data (data length). The transmission data is transmitted in 32-bit units. These packets are transmitted from, for example, set top box 24 to node 22 of FIG. 5; or from node 22 to node 23, etc.

FIG. 13 shows a more detailed illustrative structure of node 22 (which is the audio equipment), set top box 24 and IEEE 1394 bus 21. A tuner 51 in the IRD module 41 of the set top box 24 receives signals furnished from the antenna 31, and selectsthe signals supplied from a pre-set satellite transponder in response to a command from a central processing unit (CPU) 71 (which functions as the controller 11 of FIG. 1) to output the received signal to a front end unit 52 where it is demodulated and supplied to a descrambling circuit 53.

The descrambling circuit descrambles data supplied from the front end unit 52, based on encryption key information stored in an IC card (not shown) in the IRD module 41. The descrambled data is output to a demultiplexer 54, which removes command components (i.e. commands from the user) to output a video stream composed of video packets to an MPEG (Moving Picture Experts Group) video decoder 55 and to output an audio stream composed of audio packets to an MPEG audio decoder 58.

The MPEG video decoder 55 decodes the input video stream and supplies the decoded video stream to an NTSC encoder 56 which converts the decoded video data into NTSC-compatible video data that is converted to analog form by a D/A conversion circuit 57 and then output to a monitor 61. The MPEG audio decoder 58 decodes the audio stream supplied from the demultiplexer to restore the PCM (pulse code modulation) audio data that had been present prior to MPEG compression coding. The restored PCM audio data is output to a D/A conversion circuit 59 which converts the PCM audio data into left-channel analog audio signals and right-channel analog audio signals and supplies the analog audio to a speaker (not shown) of the monitor 61.

The output of the MPEG audio decoder 58 also is inputted to an IEEE 1394 interface 81, which is similar to the IEEE 1394 interface 6 of FIG. 1, from which the decoded audio stream is output to the IEEE 1394 bus 21.

The application module 42 of the node comprising set top box 24 includes CPU 71, a RAM (random access memory) 72 and a work RAM 73 controlling various portions of the set top box 24. RAM 72 stores programs processed by the CPU 71 and work RAM 73 stores data needed by the CPU to execute a variety of processing operations.

In the illustrated example, node 22 includes a magneto-optical disc device, such as a mini-disc (MD) device. A CPU 101, which functions as the controller 11 of FIG. 1, but now in node 22, controls various portions of node 22. A RAM 102 stores data and programs needed by the CPU 101 to execute various processing operations. An IEEE 1394 interface 110, similar to the IEEE 1394 interface 6 of FIG. 1, executes the interfacing processing operations for the IEEE 1394 bus 21. IEEE 1394 interface 110 receives control data supplied thereto from the set top box 24 by way of IEEE 1394 bus 21. Interface 110 outputs the PCM audio data from the MPEG audio decoder of the set top box to an ATRAC (adaptive transform acoustic coding) encoder 107 adapted for speech compression encoding the PCM audio data. Under the control of CPU 101, the ATRAC encoder also encodes data supplied thereto from A/D conversion circuit 106 (which digitizes left and right analog audio signals inputted from terminals 123, 124) or from a digital input terminal 125. The ATRAC encoder outputs the resulting compressed PCM audio data to a recording and/or reproducing system 103. CPU 101 controls the recording operation of the recording and/or reproducing system and the operation of an optical pickup 104, based on control data supplied via the IEEE 1394 bus from the set top box 24. The recording and/or reproducing system appends error correction codes to the PCM audio data and modulates the resulting data in a pre-set manner for recording by the optical pickup in a specified region of magneto-optical disc 105.

Data reproduced from the magneto-optical disc 105 by optical pickup 104 is corrected for errors and demodulated by the recording and/or reproducing system 103 and supplied to an ATRAC decoder 108 which decodes the played back audio data. The resulting digital playback data is output to a terminal 122. Alternatively, the played back digital data is converted by a digital to analog conversion circuit 109 to left channel audio signals and right channel audio signals and supplied to a speaker 121.

The foregoing operation may be controlled by hardware or by software. If software is used, a program is installed on a computer such as CPU 71 in the set top box 24, or on a general-purpose personal computer, which as is known, executes a variety of programs. The software program to be installed may be furnished to the user in the form of a pre-installed program on a hard disc or a semiconductor memory recording medium for the personal computer. Alternatively, the software program can be furnished in the form of a floppy disc, a CD-ROM, MO (magneto-optical) disc, DVD (digital versatile disc) or other magnetic disc or semiconductor memory. The software program may also be transmitted over a radio path from a downloading site through a digital satellite broadcasting system or over a wired path or network to the personal computer so as to be stored on the computer hard disc.

What is claimed is:

1. A method of communicating information between a plurality of nodes connected to an IEEE 1394 serial bus, wherein isochronous communication and asynchronous communication are performed on said bus and a node of isochronous resource manager is on said bus, comprising the steps of:

determining a value of maximum number of cable hops on said bus;

calculating predetermined communication parameters as a function of said determined value;

determining a value of bandwidth to be used for said isochronous communication from said predetermined communication parameters; and acquiring said bandwidth from said isochronous resource manager, wherein a root node of said bus has highest value of node identification, and said maximum number of cable hops is determined from a value of node identification (node ID) of said root node.

2. The method of claim 1 wherein the step of calculating predetermined communications parameters comprises calculating a propagation time as a function of said actual number of connections of said nodes, a length of a transmission path between nodes and a physical delay of a node; and calculating an arbitration time as a function of the calculated propagation time and time needed by a node to effect calculations.

3. The method of claim 1 wherein said communication is asynchronous communication over said IEEE 1394 serial bus wherein data packets are time division multiplexed as a function of said predetermined communication parameters.

4. The method of claim 3 wherein said time division multiplexing includes gaps between packets, said gaps having a duration based upon said actual number of connections of said nodes.

5. Apparatus for communicating information between a plurality of nodes connected to an IEEE 1394 serial bus, wherein isochronous communication and asynchronous communication are performed on said bus and a node of isochronous resource manager is on said bus, comprising:

means for determining a value of maximum number of cable hops on said bus;

means for calculating predetermined communication parameters as a function of said determined value;

means for determining a value of bandwidth to be used for said isochronous communication from said predetermined communication parameters; and means for acquiring said bandwidth from said isochronous resource manager, wherein a root node of said bus has highest value of node identification, and said maximum number of cable hops is determined from a value of node identification (node ID) of said root node.

6. The apparatus of claim 5 wherein said parameter calculating means calculates a propagation time as a function of said actual number of connections of said nodes, a length of a transmission path between nodes and a physical delay of a node; and calculates an arbitration time as a function of the calculated propagation time and time needed by a node to effect calculations.

7. The apparatus of claim 5 wherein said communication is asynchronous communication over said IEEE 1394 serial bus wherein data packets are time division multiplexed as a function of said predetermined communication parameters.

8. The apparatus of claim 7 wherein said time division multiplexing includes gaps between packets, said gaps having a duration based upon said actual number of connections of said nodes.

* * * * *